United States Patent [19]
Pritchard

[11] Patent Number: 4,839,997
[45] Date of Patent: Jun. 20, 1989

[54] BRUSH SEAL MANUFACTURE
[75] Inventor: Robert B. Pritchard, Bristol, England
[73] Assignee: Rolls-Royce plc, England
[21] Appl. No.: 109,046
[22] Filed: Oct. 16, 1987
[30] Foreign Application Priority Data
    Oct. 24, 1986 [GB] United Kingdom ............... 8625548
[51] Int. Cl.⁴ .................................................. B24B 5/06
[52] U.S. Cl. ........................................ 51/290; 51/109 R;
    51/125; 51/DIG. 17; 51/227 R
[58] Field of Search .............. 51/109 R, 125, 241 VS,
    51/245, 281 P, 290, DIG. 17, 227 R, 34 R

[56] References Cited
U.S. PATENT DOCUMENTS
4,715,149  12/1987  Kelsey .......................... 51/241 VS
4,757,645  7/1988   Ozer et al. ..................... 51/209 R FOREIGN PATENT DOCUMENTS
1148907  5/1963   Fed. Rep. of Germany ........ 51/290
0157778  7/1987   Japan .................................. 51/209 R
0453290  2/1975   U.S.S.R. ............................ 51/DIG. 17
1450553  9/1976   United Kingdom .
2001400  1/1979   United Kingdom .
2021209  11/1979  United Kingdom .
2022197  12/1979  United Kingdom .
2033026  5/1980   United Kingdom .

Primary Examiner—Frederick R. Schmidt
Assistant Examiner—Robert A. Rose
Attorney, Agent, or Firm—Oliff & Berridge

[57] ABSTRACT

An apparatus for machining a brush seal 19 comprising a clamp for holding the brush seal 14 and a cutting member 16 having a diameter which corresponds to the required finished diameter of the seal 19. The cutting member comprises a cup having an axis of rotation R which is positioned to be coincident with the brush seal axis of rotation S. The machining process is conducted by revolving the mandrel and moving it along its axis of rotation such that an edge portion 38 cuts the bristle material at a required diameter and an outer portion 34 acts to grind the bristle elements to the required diameter.

3 Claims, 3 Drawing Sheets

BRUSH SEAL MANUFACTURE

This invention relates to improvements in the manufacture of brush seals and in particular to a method of machining the bristle elements which form part of such a seal.

Brush seals as described in our UK Patent No. 2,001,400 comprise a pair of annular sideplates having a plurality of bristle elements which are sandwiched therebetween and extend generally radially therefrom. The free ends of the bristle elements are the portion of the seal which are machined to define its working diameter.

One method of machining the bristle elements is to use an Electro Discharge Machine having a cutting means in the form of a wire. The wire is used to conduct a rough cutting operation before a final finish grinding technique is employed to produce the seals finished diameter. Electro discharge machining of the bristles produces a very uneven cut and necessitates leaving a greater than desired amount of material for the grinding operation to remove. The combination of machining operations is both time consuming and expensive.

A further method of machining the bristle elements is to use an electro chemical grinding technique. This technique solves the problem of uneven cut associated with the electro discharge machining technique mentioned above but is itself still a very slow and expensive process.

This invention attempts to reduce and possibly eliminate the problems associated with the above mentioned techniques by providing a method of machining the bristles of a brush seal which is simple, accurate, quick and relatively inexpensive.

The present invention will now be described by eay of example only with reference to the following drawings, in which.

Figure 1:
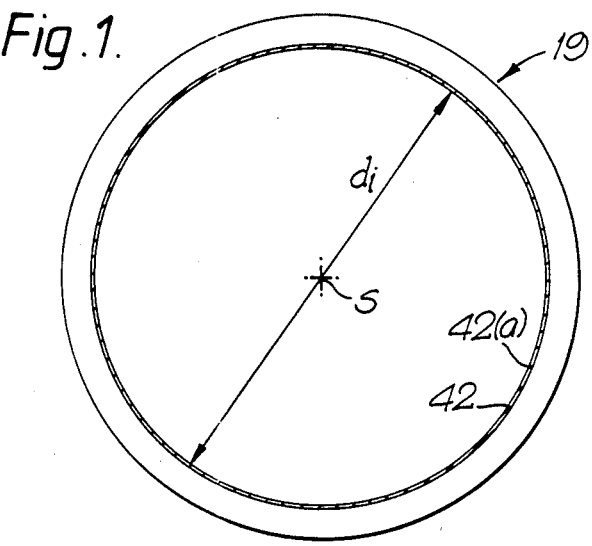
FIG. 1, illustrates a brush seal.
Figure 2:
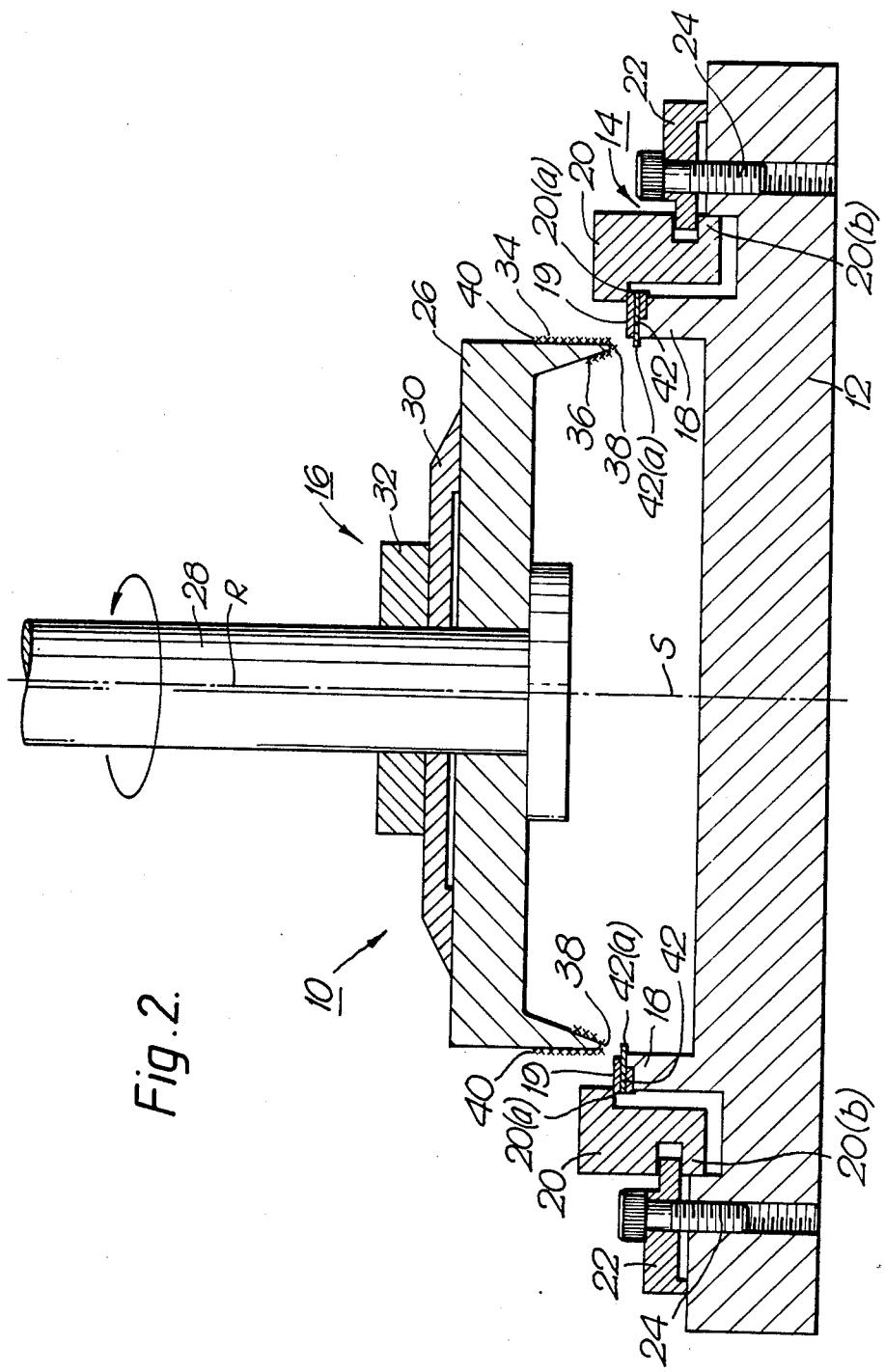
FIG. 2, is a cross-sectional view of the bristle machining apparatus.

Referring to FIGS. 1 and 2, the apparatus shown generally at 10 comprises a base portion 12, a clamping means 14 and a cutting head shown generally at 16. The base portion 12 is provided with a region 18 which is shaped to accommodate the brush seal 19. Preferably the region 18 is adapted to support the bristles 42 at their free end 42(a) to reduce the possibility of deflection during machining. It will be appreciated that the support should terminate just short of the diameter at which the machining operation takes place. The clamping means comprises a clamping ring 20, each of which has a first portion 20(a) shaped to communicate with the brush seal 19 and a second portion 20(b) which is shaped to communicate with a clamping finger 22. The finger 22 is urged downwardly by the action of a securing means, shown in the form of a bolt at 24, such that the clamping block 20 acts on the brush seal 19 to secure it to the base portion 12 during machining. The cutting head 16 comprises a cup wheel 26 which is mounted on a driveshaft 28 and retained thereon by a loading disk 30 and clamping nut 32. The cup mandrel 26 is provided with an outer portion 34, an inner portion 36 and an edge 38, each of which are coated with an abrasive cutting compound shown at 40. Referring particularly to FIG. 2, the mandrel 26 is positioned centrally above the annular brush seal 19 such that its axis of rotation R is coaxial with the axis of rotation of the brush seal S, and its outer portion 34 overlaps the end of the bristles 42 which are to be machined.

In operation, the mandrel 26 is rotated in the same direction of rotation of the component (not shown) against which it is desired the bristles 42 should act. An initial cut is made by plunging the mandrel 26 into the brush seal bristles 42 such that the edge 38 acts to cut the first few layers of said bristles 42 and hence establish an edge on the bristles which is suitable for grinding to size. Once an initial plunge cut has been established the remaining bristles 42 may be severed whilst using a greater feed rate than that initially used to establish the edge 44. When all the bristles have been severed the mandrel 26 may be allowed to dwell such that the outer portion 34 acts on the severed ends of the bristles 42 and grinds them to size.

Figure 3:
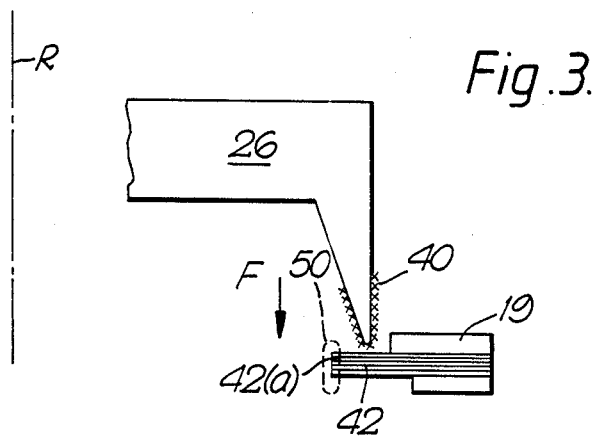
FIGS. 3, 4 and 5 illustrate the machining head of the apparatus in three different positions relative to the brush seal.
Figure 5:
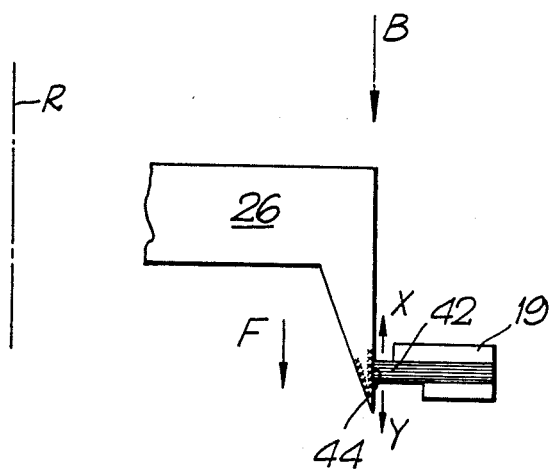
Figure 6:
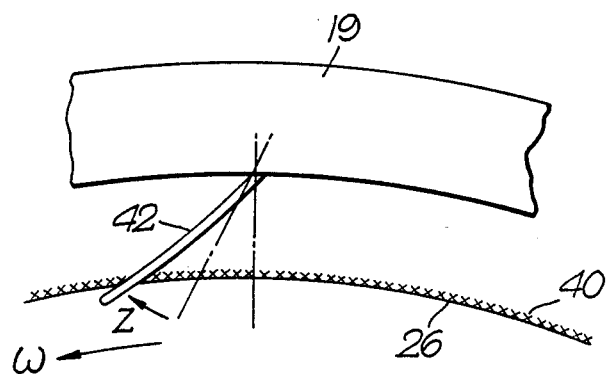
FIGS. 6 and 7 are partial plan views taken in the direction of arrows A and B in FIGS. 4 and 5 respectively.
Figure 7:
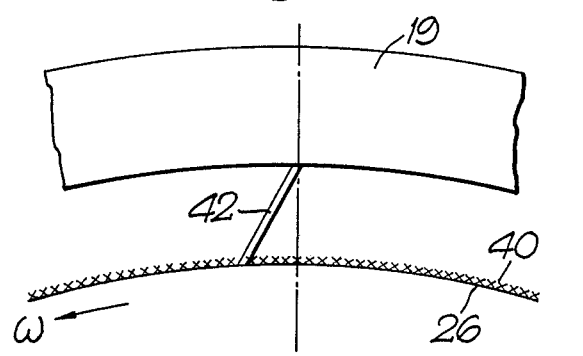

It has been found that the bristles 42 may deflect in one or more of three different directions during the machining process. The bristles 42 may be deflected vertically upwards or downwards over the outer portion 34 of the mandrel 26 (arrows x, y respectively in FIG. 5) or deflected in the direction of rotation ω of the mandrel 26 as shown by arrow Z in FIG. 6. It will be appreciated that bristles deflected in the above mentioned manner will not be machined to the final size. This problem may be overcome by making several machining passes until each bristle lies at its correct working angle and no vertical displacement is present. An alternative solution could be to secure the free ends 42(a) of the bristles 42 by for example welding, clamping or the use of an adhesive shown generally at 50 in FIG. 3.

Figure 4:
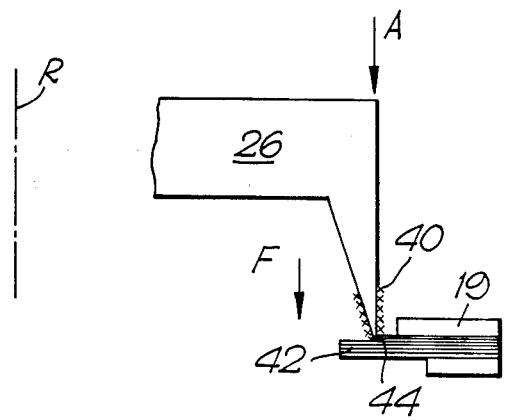

It has been found that a bristle made from for example Haynes 25 may be machined by a mandrel 26 having a coating 40 of cubic boron nitride (CBN) having a grit size in the range of CBN 64 (230–270 grit) to CBN 126 (120–150 grit) when the speed of cut is selected in the range of 17 m/s to 60 m/s. An initial feed rate of 0.01″/minute may be followed by a feed rate of 0.03″/minute when all the bristles 42 have been severed by the mandrel 26. The speed of cut is the speed at which the outer portion 34 of the mandrel 26 passes the severed edges of the bristles 42, whilst the feed rate is the rate at which the mandrel 26 is traversed through the bristles in the direction of arrow F in FIGS. 3 to 5.

It has also been found that a cup mandrel 26 made of steel and coated with CBN conducts the heat generated during machining away from the bristles 42 sufficiently well to eliminate the need for coolants when the speed cut is below 30 m/s. It will also be appreciated that the brush seal 19 may be rotated in a direction of rotation which is opposite to the direction of rotation W of the mandrel 26 if required.

I claim:

1. A method of machining a brush seal of the type which comprises a pair of annular sideplates having a plurality of bristle elements which are sandwiched therebetween and extend generally radially therefrom and which is provided with an axis of rotation, the method comprising holding a brush seal in a first member and removing unwanted material from the bristle elemetns of said seal with a machining device having an outer portion having a diameter equal to a finished bore diameter of said brush seal, an inner portion, and an edge, in which the machining device is rotated about an axis which is coaxial with the axis of rotation of the brush seal and is traversed in a direction along said axis such that the edge acts on an entire circumference of the bristle elements simultaneously in order to cut and remove unwanted bristle material therefrom and in which the outer portion acts on an entire inner circumference of said cut bristles simultaneously to machine them to a predetermined size.

2. A method according to claim 1 in which the machining device is rotated in a direction which is the same as the operational direction of rotation of the component against which it is desired the bristle elements should act.

3. A method according to claim 1 in which the first member is rotated in a direction which is opposite to the operational direction of rotation of the component against which it is desired the bristle elements should act.

* * * * *